Dec. 17, 1946.    G. W. MULLER    2,412,743
RAIL JOINT
Filed Dec. 17, 1943    3 Sheets-Sheet 2
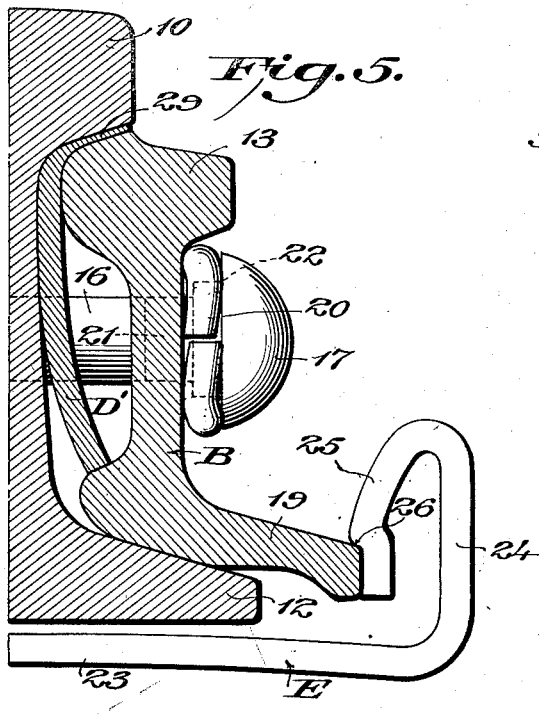
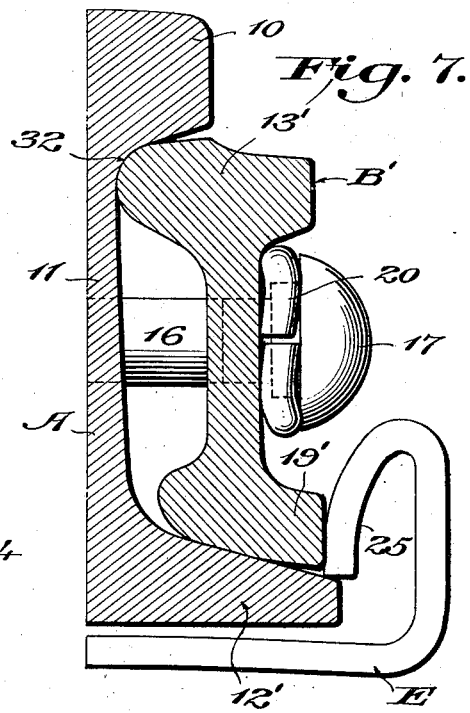
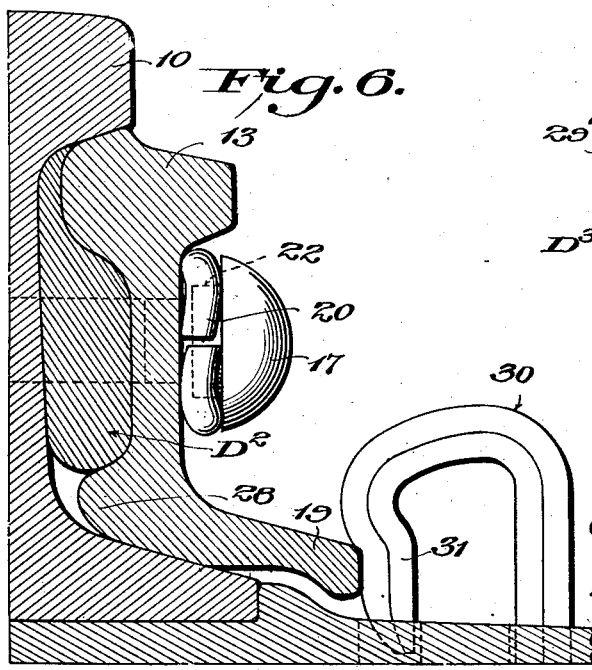
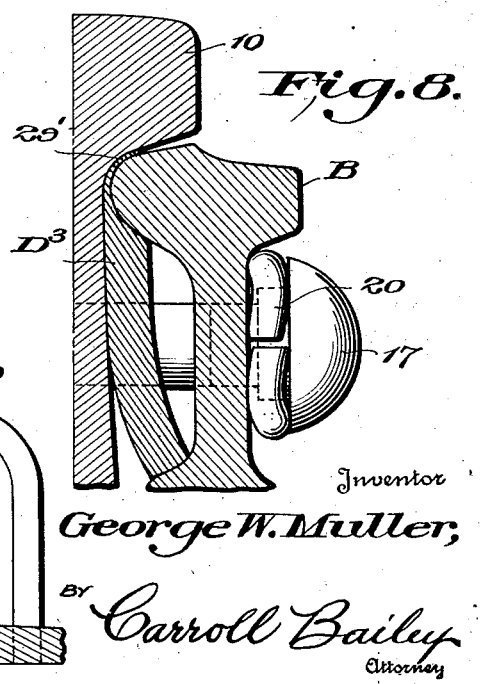
Inventor
George W. Muller,
By Carroll Bailey
Attorney Dec. 17, 1946. G. W. MULLER 2,412,743
RAIL JOINT
Filed Dec. 17, 1943 3 Sheets-Sheet 3
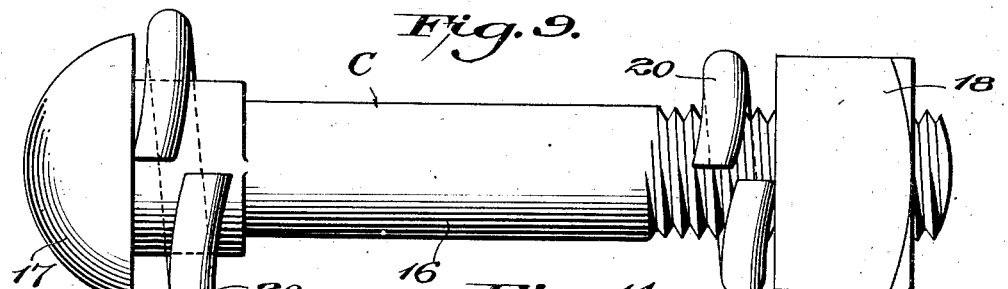
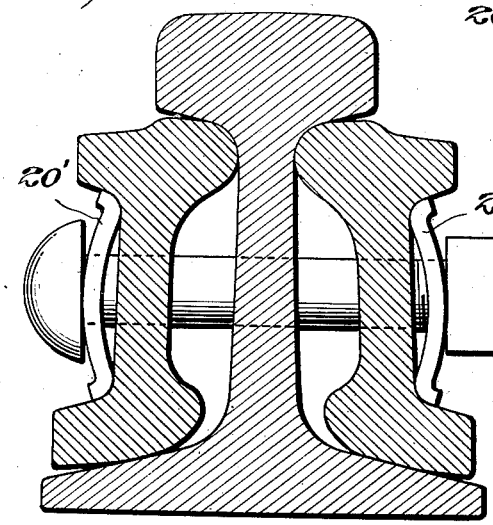
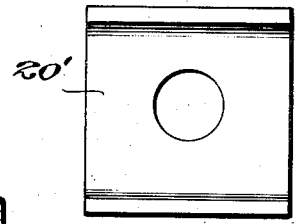
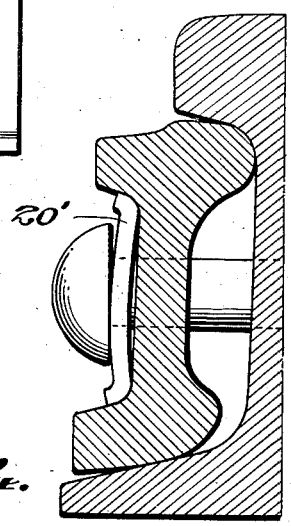
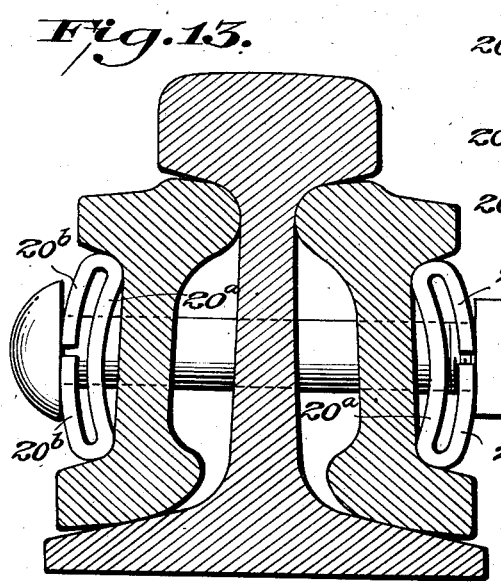
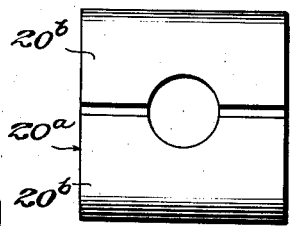
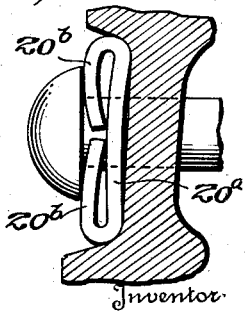
George W. Muller,
By Carroll Bailey
Attorney Patented Dec. 17, 1946

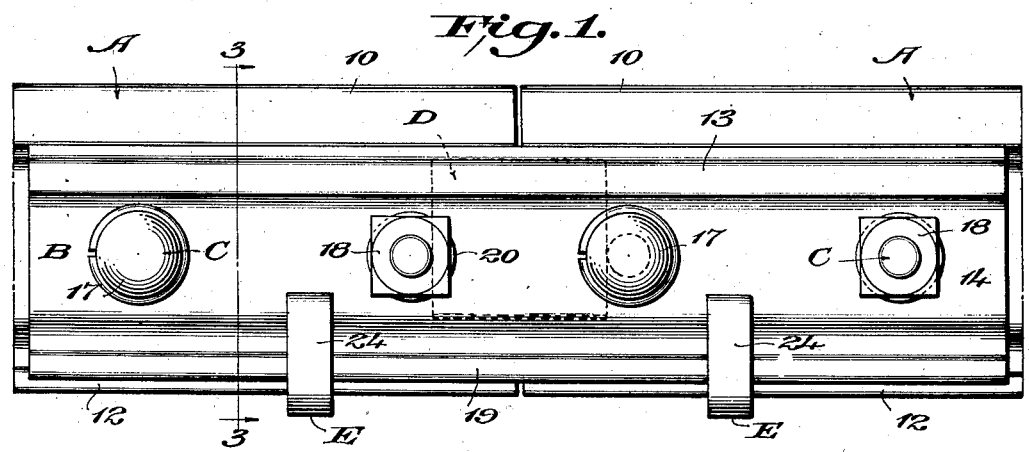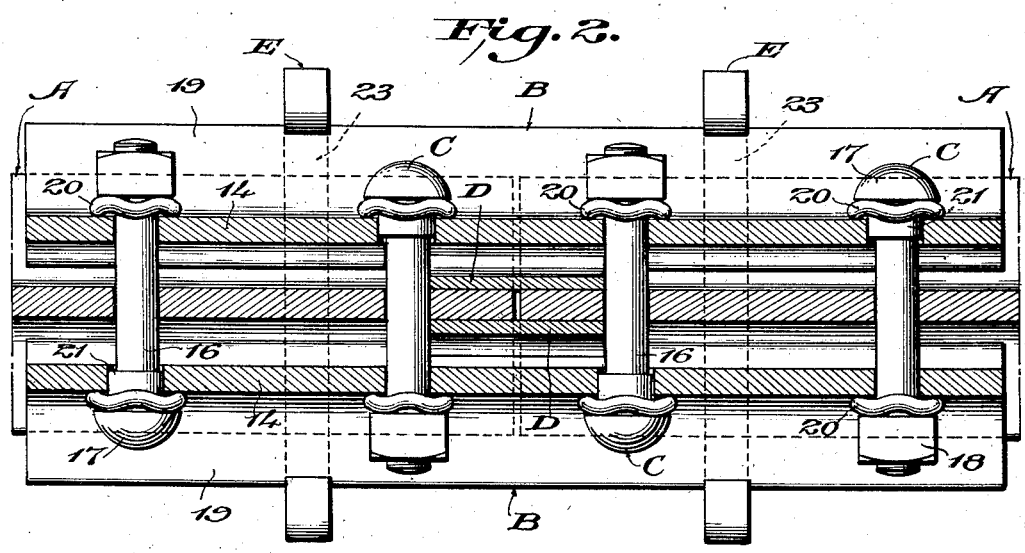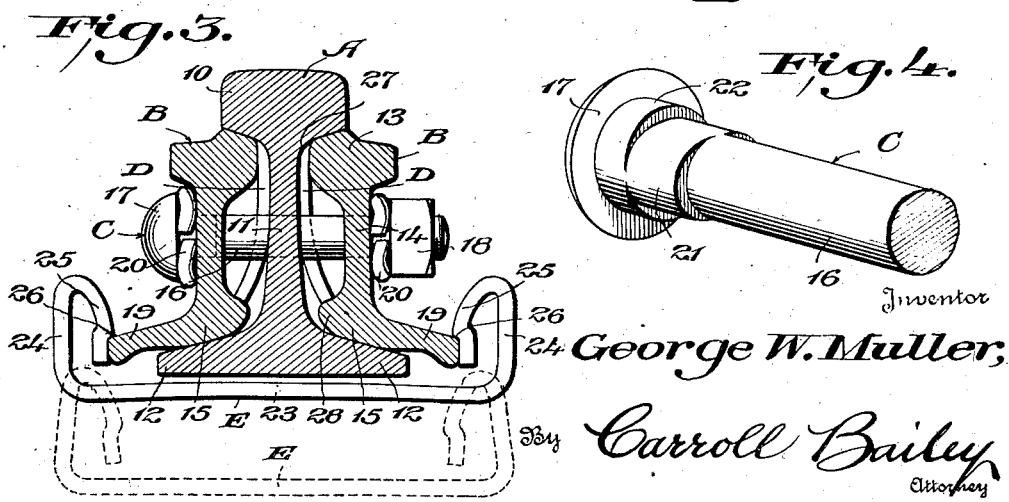

2,412,743

UNITED STATES PATENT OFFICE 2,412,743

RAIL JOINT

George W. Muller, Miami Beach, Fla.

Application December 17, 1943, Serial No. 514,685

10 Claims. (Cl. 238—244)

This invention relates to rail joints, and has for its general object to provide practical, efficient spring-pressure means acting constantly to maintain the joint elements tightly assembled with one another, thus to insure long life and efficient and satisfactory performance of the joints in service with comparatively little maintenance attention and at low maintenance cost.

Because of the peculiar cross sectional shape of rails and splice bars and the manner in which they are assembled and cooperate with each other, it is difficult to maintain rail joints tight under the wheel loads and impacts to which they are subjected in service. The under faces of the heads of the rails are inclined upwardly and outwardly and usually the upper faces of the heads of the splice bars are correspondingly inclined and have fishing engagement with said under faces of the rail head, although in some instances the loading engagement between the heads of the splice bars and the rails is confined to the rounded upper inner portions of the splice bars and the correspondng rounded head-web fillets of the rails. In any event, the upper faces of the base flanges of the rails are inclined downwardly and outwardly and in practically all instances the splice bars are seated at their bottoms upon these faces. In other words, regardless of whether the heads of the splice bars seat against the under faces of the rail heads or against the head-web fillets of the rails, the splice bars have inwardly directed wedging engagement with the rails. Consequently, there is a very pronounced tendency of the splice bars to be squeezed outwardly relative to the rails by traffic loads imposed upon the rails. In particular, there is a decided tendency of the bases of the splice bars to slide or ride downwardly and outwardly upon the downwardly and outwardly inclined upper faces of the rail flanges, both under the heavy weight of the splice bars and wheel loads imposed upon the joint. As a result, if the joint bolts should be tight, the splice bars will tend to pivot or fulcrum about the joint bolts with consequent tendency of the heads of the splice bars to shift inwardly. If, on the other hand, the joint bolts should be loose, the splice bars initially may shift bodily outward, but when the limit of their bodily outward shifting movement is reached they again will tend to pivot or fulcrum about the joint bolts in the same manner as if the joint bolts were tight.

The joint bolts in themselves, even if they are maintained substantially tight by periodic tightening, are incapable, due to their disadvantageous middle location relative to the joint, of preventing the stated pivoting or fulcruming action of the splice bars under wheel loads imposed on the joint. Consequently, wear between the contacting faces of the splice bars and the rails soon develops, and when this occurs it is practically impossible to maintain the joint tight, with the result that the stated action of the splice bars is accentuated with the passing of each wheel over the joint. Wear and looseness combine in a vicious circle, one promoting the other, with the result that, once looseness and wear begin, they develop at a progressively increasing rate. All of the relatively heavy joint elements soon become loose and pound against one another, the rail ends sag or flex downwardly at their ends, the joint bolts are subjected to increasing bending, shearing and elongating stresses and general deterioration of the joint develops rapidly. In short, the life of most present rail joints is comparatively brief.

In some rail joints spring washers are not employed in association with the joint bolts. In such rail joints the joint bolts soon stretch and their heads and nuts form depressions in the outer faces of the splice bars or with rigid washer plates which they directly engage. Such joints therefore loosen and wear very quickly, and deteriorate quite rapidly.

In other rail joints only a single spring washer is employed in association with each joint bolt, these washers being disposed beneath the nuts of the bolts. If sufficiently strong, such washers assist materially in prolonging the life of a joint by virtue of absorbing some of the forces imposed upon and tending to stretch the joint bolts and by tending to hold the joint elements in anti-rattling, anti-pounding contact with one another. A single washer employed in association with each joint bolt beneath the nut thereof does not, however, prevent the bolt heads, which usually are small and have direct, stiff, sluggish bearings against the sides of the splice bars or against rigid washer plates, from rapidly wearing depressions in the splice bars or the rigid washer plates, as the case may be. The result is that as such wear develops the washers become weaker and less able to perform their function of holding the joint elements in contact with one another. Moreover, it is impractical to employ in association with each joint bolt only a single spring washer having the requisite strength to hold the joint elements in effective contact with one another. Furthermore, in a rail joint employing only a single spring washer in association with each joint bolt, the two sides of the joint are not uniform with respect to either rigidity or flexibility. Such joints therefore are subjected to damaging and deteriorating twisting stresses. Moreover, the splice bars in such joints are not held effectively against sliding downwardly and outwardly at their bottoms and therefore are not held against pivoting or fulcruming about the joint bolts. Thus, while such joints are superior to joints not employing any spring washers in association with the joint bolts, they do not in any real measure serve as the answer to the problem of providing a joint which remains tight.

According to the present invention, two strong spring washers of equal strengths, are employed in association with each joint bolt, one beneath the nut of the bolt and the other beneath the head of the bolt. The two sides of the joint therefore are substantially uniform as regards rigidity and flexibility and consequently damaging, twisting stresses in the joint largely are avoided. At the same time, direct, stiff and sluggish wear producing contact of the bolt heads and nuts with the splice bars or with rigid washer plates, as the case may be, is avoided. Moreover, there is little or no wear between the washers and the bolt heads and the bolt nuts because the washers may yield in response to any canting of the bolts. Moreover, and most importantly, the two strong spring washers afford double the amount of holding power and double the amount of automatic wear compensating take-up as compared with a single washer in maintaining the joint elements in tight, wear resisting engagement with one another.

The use of two strong spring washers in association with each joint bolt in the manner stated is quite advantageous in itself over the use of only a single washer in association with each joint bolt. But even the use of two spring washers in association with each joint bolt does not in itself serve effectively to hold the bottom portions of the splice bars against downward and outward, looseness and wear-promoting sliding movement upon the upper faces of the rail flanges. Therefore, a special and important object of the present invention is to provide strong, yieldable means for direct cooperation with the bottom portions of the splice bars to urge them constantly inwardly and upwardly at their bottoms and to practically prevent any downward and outward sliding movement of their bottoms upon the upper faces of the rail flanges, which in turn greatly assists in holding the joint bolts steady. The dual spring washers associated with each joint bolt materially assist, of course, in accomplishing this purpose while permitting all necessary flexibility of the joint to permit the natural wave motion of the rails to pass uninterruptedly through the joint. Thus, the present joint possesses all necessary flexibility and, at the same time, possesses exceptionally long life while remaining tight and highly satisfactory in service with little or no maintenance attention due, in large measure, to elimination of the principal source of looseness and wear-promoting movement of the splice bars relative to the rails, namely, downward and outward movement of the bottom portions of the splice bars relative to the rails.

Rail joints in service are subjected not only to extremely heavy downwardly directed traffic loads, but also to great lateral loads by rolling stock wheel flanges, particularly at points where the track is curved. These lateral loads tend to shift the rail ends laterally relative to each other and thus are a major factor in promoting looseness and wear of the joints.

Most rail joints in general use rely solely upon the splice bars and, of course, the joint bolts, to hold the rail ends against lateral deflection relative to each other. The splice bars and the joint bolts, however, do not in themselves effectively perform this function. Accordingly, a special and important object of the present invention is to provide means in addition to and for cooperation with the splice bars and the joint bolts to hold the rail ends effectively against lateral movement relative to each other. For this purpose, there are interposed and clamped between the splice bars and the rail ends guide plates or guide blocks which effectively prevent any lateral movement between the splice bars and the rail ends. The rail ends therefore are held effectively against any lateral movement relative to each other and the entire joint is maintained laterally tight, due particularly to the spring washers associated with the joint bolts and to the yieldable means substantially preventing any outward movement of the bottom portions of the splice bars relative to the rails and thereby substantially eliminating any rocking movement of the splice bars. These guide blocks, by acting to hold the rail ends against lateral movement relative to the splice bars and relative to each other, greatly assist in relieving the joint bolts of bending, shearing and stretching forces and thereby greatly assist in maintaining the entire joint vertically tight as well as laterally tight. They are confined to the rail ends between the innermost joint bolts by which they are retained in place against longitudinal movement relative to the joint. Therefore, they do not interfere with the required flexibility of the joint to permit the natural wave motion of the rails to pass freely through the joint. These guide blocks may, if desired, be provided with wear compensating lips to extend between worn portions of the splice bars and the rails.

The net result of the combination of features comprising the invention is that the rail ends are maintained high and are firmly supported against vertical and lateral deflection, looseness and wear of the joint parts is greatly retarded, and the joint is highly satisfactory in service while possessing exceptionally long life with little or no maintenance attention, all as has been conclusively demonstrated by long, continuous use of the joints in track under actual heavy service conditions.

A special object of the invention is to provide means in the form of a simple, one-piece, spring-steel yoke element to urge the bottom portions of the splice bars inwardly relative to the rails and to hold the said bottom portions of the splice bars effectively against sliding downwardly and outwardly upon the rail flanges; also, to so construct this yoke that it may be applied readily and easily to the splice bars and is energized by its application thereto so as to act constantly thereafter to urge the bottom portions of the splice bars inwardly and the entire splice bars upwardly.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the accompanying drawings, wherein like characters of reference denote corresponding parts in related views:

Figure 1 is a side elevation of a rail joint of the Standard type embodying the novel features of the invention.

Figure 2 is a horizontal section through the joint in the plane of the bolts thereof.

Figure 3 is a cross section on the line 3—3 of Fig. 1.

Figure 4 is a fragmentary perspective view of one of the joint bolts.

Figure 5 is a half-cross sectional view illustrating a filler element between the splice bar and the rail provided with a thin wear-compensating lip interposed between worn top fishing surfaces of the splice bar and the rail.

Figure 6 is a half-cross sectional view illustrating a filler element of alternative form interposed between the splice bar and the rail and further illustrating a spring-head spike for constantly urging the splice bar inwardly at its bottom relative to the rail.

Figure 7 is a half-cross sectional view illustrating a rail joint of the Headfree type embodying the features of the invention.

Figure 8 is a view similar to Fig. 7 illustrating a filler element having a thin, wear-compensating lip interposed between the head-web fillet of the rail and the rounded, upper, inner portion of the splice bar.

Figure 9 is a side elevation of a bolt and a pair of spring washers such as may be used in a joint constructed in accordance with the invention.

Figure 10 is a cross-sectional view through a rail joint showing form of spring washer elements in the bowed spring plates for use in lieu of and for the same purpose as the spring washers shown in Fig. 9, the said plates being shown in their normal uncompressed form.

Figure 11 is an elevation of one of the spring plates shown in Fig. 10.

Figure 12 is a half-cross sectional view showing one of the spring plates in its compressed, operative condition; and Figures 13, 14 and 15 are views similar to Figs. 10, 11 and 12, respectively, illustrating an alternative form of spring plate for use in lieu of and for the same purpose as the spring washers shown in Fig. 9.

Referring to the drawings in detail, first with particular reference to Figs. 1 to 4, A, A designate the meeting end portions of a pair of rails, each including, as usual, a head 10, a web 11 and base flanges 12, 12; B, B designate a cooperating pair of splice bars, one disposed at each side of the rails A, A and each including, as usual, a head 13, a web 14 and a base 15; C designate joint bolts for clamping the splice bars B, B against the rails and each including, as usual, a shank 16, a head 17 and a nut 18; D, D designate guide elements interposed between the splice bars and the rails for holding the latter against lateral and vertical movements relative to each other, and E designate spring yoke elements for urging the bottom portions of the splice bars constantly inwardly and upwardly relative to the rails.

According to the invention as illustrated in Figs. 1 to 4, the joint is of the so-called "Standard" type in which the top faces of the heads 13 and the bottom faces of the bases 15 of the splice bars B, B have fishing engagement with the under and the upper faces of the heads and the base flanges of the rails, respectively. Moreover, the splice bars illustrated in Figs. 1 to 3 are of the type in which their base flanges 19 are relatively wide and extend outwardly beyond the outer edges of the base flanges 12 of the rails.

The bolts C extend, as usual, through alined openings in the webs 14 and 11 of the splice bars and the rails, respectively, and serve, as usual, to hold the splice bars in inwardly drawn positions with their head and base fishing surfaces in tight engagement with the under faces of the heads and the upper faces of the base flanges of the rails, respectively. However, as distinguished from the usual prior practice of employing, either no spring washer or only a single spring washer in association with each joint bolt C, the present invention employs, in association with each bolt C, two spring washers 20, 20, one interposed between the nut 18 of the bolt and the outer face of the web of one of the splice bars and the other interposed between the head 17 of the bolt and the outer face of the web of the other splice bar.

The washers 20, 20 may be of conventional circular form, rectangular or any other suitable or desired form. In any event, they are of equal or approximately equal strengths so that both of the splice bars are urged inwardly by equal or approximately equal spring pressures to insure uniform action of both sides of the joint under wheel loads imposed thereon.

In the usual rail joint in which there is employed, in association with each bolt C, either no spring washer or only a single spring washer interposed between the nut of the bolt and the outer face of the web of the related splice bar and in which the usually small head of the bolt directly engages the outer face of the web of the other splice bar, the two sides of the joint are not held uniformly stiff and uniformly flexible under wheel loads with the result that stresses are distributed very disadvantageously ununiformly through the joint. Moreover, in the usual joint in which the usually small heads of the joint bolts contact directly with the outer faces of the webs of the splice bars and have small bearing areas thereon, the sharp corners of said heads soon cut into the outer faces of the webs of the splice bars with the consequent danger of promoting cracks or progressive fatigue in the splice bars which may cause them to break, and, in any event, with consequent loosening of the joint and the promotion of rapid wear upon the different contacting faces of its parts. By employing a spring washer beneath the head as well as beneath the nut of each bolt, these disadvantages are avoided and, at the same time, the two sides of the joint are, as aforesaid, rendered desirably uniformly stiff and uniformly flexible under wheel loads with the great advantage that stresses are distributed substantially equally through both sides of the joint. Moreover, the two spring washers afford twice the amount of stored energy and twice the amount of automatic wear-compensating take-up in the joint as compared with the usual single washer. Consequently, the present joint possesses materially longer life, is more satisfactory and efficient in service and requires far less maintenance attention at considerably less cost than the usual joint employing either no spring washer or only a single spring washer in association with each joint bolt.

The shank of the usual joint bolt, adjacent to the bolt head, is of oval shape in cross section to fit into an opening of the same shape in the adjacent splice bar to hold the bolt against rotation. The shanks 16 of the present bolts C also have portions 21 of oval shape in cross section to fit into holes of the same shape in the splice bars for the same purpose. Additionally, however, the shanks of the present bolts, directly adjacent to their heads 17, preferably are of circular shape in cross section, as indicated at 22, to fit snugly in the washers 20 interposed between said heads 17 and the splice bars 14 and thus hold said washers against undesirable lateral shifting movements relative to the bolts and splice bars. Moreover, the heads of the present bolts are larger than the heads of the bolts now in common use to afford larger bearing areas at the inner sides of said heads.

In practically all rail joints of the splice bar type, the splice bars tend to shift outwardly and downwardly at their bottoms and inwardly at their tops and are not effectively restrained against such shifting by present methods of joint bolting, with the result that looseness and wear of the joints develops quite rapidly. Accordingly, a special and important feature of the present invention resides in the provision of the yokes E or their equivalents cooperating directly with the lower portions of the splice bars to urge them under great force constantly inwardly and upwardly relative to the rails, thus to hold the bolts and the washers steadily in place, to maintain the joint tight, to reduce looseness of and wear on the joint parts and to maintain the rail ends desirably high.

Any desired number of the yokes E may be used in association with any given joint and said yokes may be of any desired specific form. Preferably, however, they are of one-piece construction and, generally speaking, are of U-shape in side elevation, each being formed from a length of spring steel or other suitable spring material of any desired size and shape in cross section to afford the necessary strength to urge the bottoms of the splice bars powerfully inwardly and upwardly.

Each yoke comprises a horizontal bottom portion 23 underlying the joint and a pair of vertical terminal portions, rising from the ends of said bottom portion, respectively, and disposed, respectively, at opposite sides of the joint, each terminal portion including an outer leg 24 extending upwardly from the related end of the bottom portion 23 and an inner leg 25 extending inwardly and downwardly from the top of the leg 24 and having its inner face, near its free, lower end, engaged with the outer edge of the related splice bar flange 19.

The bottom portion 23 may be normally straight or it may be normally bowed. In any event, the normal distance between the inner faces of at least the lower end portions of the inner legs 25 is less than the normal distance between the outer edges of the base flanges 19 of the splice bars B, B, as illustrated by the dotted line showing of the yoke E in its normal or unapplied position at the bottom of Fig. 1. It follows, therefore, that when any given yoke is applied to a joint by first positioning the yoke beneath the joint in the manner shown by dotted lines in Fig. 3 and by then moving the yoke upwardly until the lower, free end portions of the inner legs 25 are engaged with the outer edges of the base flanges 19 of the splice bars, which may be done by any suitable pry tool or implement or in any suitable manner, the inner legs 25 are sprung outwardly relative to the outer legs 24, the latter legs likewise are sprung outwardly and the bottom portion 23 is bowed upwardly.

Consequently, great spring energy is stored in the yoke and this spring energy, in its effort to restore the yoke to its normal form, acts with great force constantly inwardly upon the outer edges of the splice bar flanges 19 to urge the bottom portions of the splice bars constantly inwardly and upwardly relative to the rails. The result is that the tendency of the bottom portions of the splice bars to shift downwardly and outwardly is checkmated and the splice bars are maintained tightly engaged with the rails, thus holding the bolts and the washers steady and rail ends high and very materially retarding the development of any looseness and wear in the joint. The joint thus possesses long life and requires very little maintenance attention.

To hold the yokes E in their applied or operative positions, the lower end portions of the inner legs 25 may be stepped outwardly relative to the upper portions of said legs, thereby to provide downwardly facing shoulders 26 for engagement with the upper faces of the splice bar base flanges 19 adjacent to their outer edges. When the yokes are applied, these shoulders snap over the upper, outer corners of the flanges 19 and the bottom portions 23 of the yokes preferably are spaced downwardly from the under faces of the rails so as not to be sprung from their operative positions by flexing of the joint. The yokes accordingly are retained in their applied positions against any possibility of their accidental loss from the joints.

In the usual joint of the Standard type the heads of the splice bars are spaced outwardly from the webs of the rails and therefore the rails are not held effectively against lateral movement relative to each other. However, in accordance with the present invention as illustrated in Figs. 1 to 3, guide plates D are provided between the splice bars and the meeting end portions of the rails and have their upper portions fitting snugly between the inner faces of the splice bar heads and the adjacent faces of the rail webs. As a result, the rail ends are held effectively against any lateral movement relative to each other with all of the advantages inherent to such holding.

The plates D are confined between the two innermost bolts of the joint and preferably have their upper ends engaged with the head-web fillets 27 of the rails and their lower ends seated upon the upper faces of the heels 28 of the splice bars. Consequently they are constantly urged upwardly by the splice bars due to the lower portions of the latter being constantly urged inwardly and upwardly by the yokes E and thereby materially assist the splice bars in maintaining the rail ends high and in holding them against vertical deflection relative to each other.

When, eventually, wear occurs upon the under faces of the heads of the rails adjacent to their ends and upon the underlying top face portions of the heads of the splice bars, the original or new-joint plates D which are devoid of any lips at their upper ends, may be replaced, as shown in Fig. 5, by similar plates D' having at their upper ends wear-compensating lips 29 to fit between the said worn faces of the splice bars and the rails. In this way, any worn joint may have its efficiency increased and even badly worn joints may be restored to a condition approximating their original, highly efficient, non-worn condition.

Instead of employing guide plates such as the plates D for holding the rails against lateral and vertical movements relative to each other, guide blocks D² as illustrated in Fig. 6 may be employed for the same purposes. As distinguished from the guide plates D, which are relatively thin and of approximately the same thickness as the widths of the spaces between the rail webs and the inner faces of the splice bar heads, the guide blocks D² are relatively thick and are cross sectionally shaped to completely, or approximately completely, fill the spaces between the rails and the splice bars above the splice bar heels 28 upon which they are seated at their lower ends. They thus cooperate with the splice bars and the rails in the same manner as the plates D to hold the rails against lateral and vertical movements relative to each other. At the same time, because they completely, or substantially completely, fill the spaces between the rails and the splice bars above the heels of the latter, they obviously act even more effectively than the plates D to prevent any lateral or vertical movement of the rails relative to each other.

The guide plates D, D' and the guide blocks D² may be formed from metal, hard wood or any other suitable material. Moreover, guide blocks similar to the blocks D², but having lips at their upper ends similar to the lips 29 of the blocks D', may be used in lieu of the blocks D² in worn joints to compensate for the wear upon the head fishing surfaces of the splice bars and the rails.

Fig. 6 also illustrates that, in lieu of yokes such as the yokes E, spikes 30 of the type having laterally yieldable head portions 31 may be employed to urge the bottom portions of the splice bars constantly inwardly.

In some rail joints, splice bars of the so-called "toeless" type are used, such splice bars being characterized by foot flanges of narrow width, the outer edges of which are disposed inwardly of the outer edges of the rail flanges. A splice bar of this type is illustrated in Fig. 7 of the drawings and is designated generally as B', the outer edge of its foot flange 19' being disposed inwardly of the outer edge of the rail flange 12' as stated. When such splice bars are used, the yokes for urging the bottom portions thereof inwardly and upwardly may be duplicates of the yokes E, except that they are of less over-all length than the yokes E and need not have the inner legs of their vertical terminal portions stepped to provide shoulders, such as the shoulders 26 of the yokes E, for cooperation with the splice bar foot flanges to retain the yokes in their applied positions. On the contrary, for use with splice bars of the type shown in Fig. 7, the yokes, a portion of one of which is illustrated in said figure and is designated generally as E', may have the inner legs 25' of their vertical terminal portions unstepped, since the lower edges of said legs 25' obviously will cooperate with the tops of the rail flanges outwardly of the toeless type splice bar foot flanges to hold the yokes against downward movement from their operative or applied positions.

Fig. 7 also illustrates a rail joint of the so-called "Headfree" type in which loading engagement between the head 13" of the splice bar B' and the rail is solely between the head-web fillet 32 of the rail and the correspondingly rounded upper, inner portion of the head of the splice bar. In a so-called "Headfree" joint, the loading engagement between the heads of the splice bars and the rails serves effectively to hold the rail heads against lateral and vertical movements relative to each other as long as the joint is not worn. Accordingly, in new or unworn joints of this type, plates or blocks such as the plates D or the blocks D² are not required. When, however, a joint of this type becomes worn, plates or blocks similar to the plates D or the blocks D², but having lips similar to the lips 29 to fit between the head-web fillets of the rails and the upper, inner rounded portions of the bar heads, may be employed in the same manner as said plates or blocks to compensate for the wear. In this connection, Fig. 8 illustrates a rail joint of the Headfree type including a plate D³ similar to the plate D, but having a lip 29' at its upper end fitting between the upper, inner corner of the splice bar and the head-web fillet of the rail to compensate for wear on these parts of the joint.

It will be understood, of course, that joints of the Headfree type may employ splice bars having relatively wide foot flanges as illustrated in Figs. 3, 5 and 6; that joints of the Standard type may employ splice bars having relatively narrow foot flanges as illustrated in Fig. 7, and that the yokes may be either of the type illustrated in Figs. 1 and 5 or of the type illustrated in Fig. 7 for use in association with such joints.

By reference to Fig. 9 of the drawings it will be observed that the washer 20 which cooperates with the head 17 of the bolt C is of greater diameter and greater normal or expanded width than the washer 20 which cooperates with the nut 18 of the bolt; also, that the head 17 of the bolt is of greater diameter than usual to afford a wider bearing area at the inner side of its head. The two washers 20, 20 are, however, of equal or approximately equal strength.

Figs. 10 to 12 of the drawings illustrate that bowed spring steel plates 20' of rectangular shape may be used in lieu of spring washers of circular shape. If plates such as the plates 20' are used, they preferably are formed to fit at their tops against the outer head-web fillets of the splice bars and at their bottoms against the outer baseweb fillets of the splice bars whereby they serve to direct the holding power of the joint bolts toward the heads and the bases of the splice bars rather than against the middle portions thereof, thus greatly to assist in holding the splice bars against undesirable cocking relative to the rails.

Figs. 13 to 15 of the drawings illustrate rectangular spring plates 20ª which are similar to and which function in the same manner as the plates 20', but which have their top and bottom portions turned upon themselves as indicated at 20ᵇ so that they are of considerably greater strength than the plates 20'.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A rail joint comprising the rails, a pair of splice bars one at each side of the rails, bolts clamping the splice bars against the rails, and yieldable means reacting from the bottom portion of each splice bar to impose a force inwardly upon the bottom portion of the other splice bar.

2. A rail joint comprising the rails, a pair of splice bars one at each side of the rails, bolts clamping the splice bars against the rails, and yieldable yoke means embracing the bottom portions of said splice bars and constantly urging them inwardly.

3. A rail joint comprising the rails, a pair of splice bars one at each side of the rails, bolts clamping the splice bars against the rails, and a spring yoke constantly urging the bottom portions of said splice bars inwardly, said yoke comprising a horizontal bottom portion extending beneath the joint, vertical portions rising from the ends of said horizontal portion, and terminal portions extending inwardly and downwardly from said vertical portions and having their free lower end portions operatively engaged with and constantly exerting force inwardly upon the bottom portions of the splice bars, the said free lower end portions being stepped outwardly to provide downwardly facing shoulders at their inner sides for engagement with the upper outer portions of the base flanges of the splice bars to hold the yoke element against downward movement from its operative position.

4. A rail joint comprising the rails, a pair of splice bars one at each side of the rails, bolts clamping the splice bars against the rails, said bolts each including a head and a nut, a spring washer between both the head and the nut of each bolt and the related splice bar, yieldable means acting directly against the bottom portions of the splice bars and constantly urging them inwardly, and elements interposed between the splice bars and the rails and acting to hold the rails against lateral movement relative to the splice bars and relative to each other, the lower ends of said elements being seated on the heels of the splice bars whereby they are urged upwardly and are maintained tightly engaged between the splice bars and the rails by inward movement of the bottoms of the splice bars relative to the rails.

5. A rail joint comprising the rails, a pair of splice bars one at each side of the rails, bolts clamping the splice bars against the rails, said bolts each including a head and a nut, a spring washer between both the head and the nut of each bolt and the related splice bar, elements interposed between the splice bars and the rails and having their upper ends engaged between the top portions of the splice bars and the rails and their lower ends seated upon the heels of the splice bars so that in response to inward movement of the bottom portions of the splice bars they are urged upwardly and their top portions are forced tightly between the top portions of the splice bars and the rails to hold the rails against lateral movement relative to each other, and a substantially U-shaped spring yoke including a horizontal medial portion underlying the joint and upwardly extending end portions operatively engaged with the bottom portions of the splice bars and constantly urging them inwardly.

6. A rail joint comprising the rails, a pair of splice bars one at each side of the rails, bolts clamping the splice bars against the rails, elements between the splice bars and the rails to hold the rails against lateral deflection relative to each other, said elements cooperating with said splice bars to be urged upwardly by inward movement of the bottom portions of the latter into tight engagement between the top portions of the splice bars and the rails, and yieldable means acting directly against the bottom portions of the splice bars and constantly urging them inwardly.

7. A rail joint comprising the rails, a pair of splice bars one at each side of the rails, bolts clamping said splice bars against the rails, a spring yoke of substantially U-shape in side elevation including a bottom portion underlying the joint and upwardly directed terminal portions engaging lower outer faces of the splice bars, the normal distance between said terminal portions being less than the normal distance between the lower outer faces of the splice bars which they engage so that they must be spread apart to be engaged with said faces and so that when they are spread apart and engaged with said faces they act constantly to urge the bottom portions of the splice bars inwardly relative to the rails, and means to hold said yoke against downward movement from its operative position relative to the splice bars.

8. Yieldable means for constantly urging the lower portions of a pair of rail joint splice bars inwardly relative to the rails, said means comprising a spring yoke of substantially U-shape including a bottom portion to extend transversely of the joint beneath the same, and upstanding terminal portions to engage lower outer faces of the splice bars, the normal distance between said terminal portions being lesser than the normal distance between the lower outer faces of the splice bars with which they are engageable so that they must be sprung apart to be engaged with said faces and so that when sprung apart and engaged with said faces they act constantly to urge the lower portions of the splice bars inwardly relative to the rails.

9. Yieldable means as set forth in claim 8 in which the terminal portions of the yoke are comprised by portions extending first upwardly and then inwardly and downwardly from the ends of the bottom portion of the yoke.

10. Yieldable means as set forth in claim 8 in which the terminal portions of the yoke are comprised by portions extending first upwardly and then inwardly and downwardly from the ends of the bottom portion of the yoke, and in which the downwardly and inwardly extending portions of said terminal portions are stepped to provide downwardly facing shoulders at their inner sides for engagement with upper faces of the lower outer portions of the splice bars to hold the yoke against downward movement relative to the splice bars.

GEORGE W. MULLER.